(12) United States Patent
Shinozaki

(10) Patent No.: US 10,737,587 B2
(45) Date of Patent: Aug. 11, 2020

(54) VEHICLE SEAT

(71) Applicant: TOYOTA BOSHOKU KABUSHIKI KAISHA, Aichi (JP)

(72) Inventor: Yushi Shinozaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/109,131

(22) Filed: Aug. 22, 2018

(65) Prior Publication Data
US 2019/0070977 A1 Mar. 7, 2019

(30) Foreign Application Priority Data

Sep. 1, 2017 (JP) ................. 2017-168661

(51) Int. Cl.
*B60R 22/22* (2006.01)
*B60R 22/26* (2006.01)
*B60R 22/18* (2006.01)
*B60N 2/01* (2006.01)
*B60N 2/07* (2006.01)
*B60N 2/015* (2006.01)
*B60N 2/68* (2006.01)

(52) U.S. Cl.
CPC .......... *B60N 2/015* (2013.01); *B60N 2/0732* (2013.01); *B60N 2/688* (2013.01); *B60R 22/22* (2013.01); *B60R 22/26* (2013.01); *B60R 2022/1806* (2013.01)

(58) Field of Classification Search
CPC ......... B60R 22/18; B60R 22/26; B60R 22/22; B60R 2022/1806; B60R 2022/263; B60N 2/015; B60N 2/06; B60N 2/0732; B60N 2/688; B60N 2002/0212
See application file for complete search history.

(56) References Cited

U.S. PATENT DOCUMENTS

| 5,102,197 A | * | 4/1992 | Itsuki | ............. B60R 22/26 297/468 |
| 5,322,348 A | * | 6/1994 | Johnson | ............. B60N 2/0705 248/430 |
| 5,332,261 A | * | 7/1994 | Siepierski | ............. B60R 22/22 280/801.1 |

(Continued)

FOREIGN PATENT DOCUMENTS

| DE | 4123102 A1 * | 1/1993 | ............. B60N 2/072 |
| FR | 2934976 A3 * | 2/2010 | ............. B60N 2/0732 |

(Continued)

*Primary Examiner* — Ryan D Kwiecinski
(74) *Attorney, Agent, or Firm* — Greenblum & Bernstein, P.L.C.

(57) ABSTRACT

Disclosed is one example of a vehicle seat in which a dimension thereof in its width direction can be smaller. The vehicle seat includes: a side frame extending in seat front-rear directions; a belt anchor bracket at least part of which is positioned below the side frame; a belt stay at least part of which is positioned below the side frame; and a coupling bolt that couples the belt anchor bracket and the belt stay to each other at a position below the side frame, the coupling bolt passing through a first member, which is one of the belt anchor bracket and the belt stay, and reaching a second member, which is the other of the belt anchor bracket and the belt stay.

10 Claims, 8 Drawing Sheets

(56) References Cited

U.S. PATENT DOCUMENTS

| | | | | |
|---|---|---|---|---|
| 6,224,130 B1 * | 5/2001 | Sasaki | ............... | B60R 22/26 |
| | | | | 280/801.2 |
| 6,299,252 B1 * | 10/2001 | Frohnhaus | ............ | B60N 2/0232 |
| | | | | 248/419 |
| 9,718,386 B2 | 8/2017 | Hayashi | | |
| 2014/0373333 A1 * | 12/2014 | Ikeda | ............... | B60N 2/688 |
| | | | | 29/428 |
| 2015/0307006 A1 * | 10/2015 | Hayashi | ............ | B60R 22/26 |
| | | | | 297/344.13 |

FOREIGN PATENT DOCUMENTS

| | | | | |
|---|---|---|---|---|
| FR | 2978402 A1 * | 2/2013 | ............ | B60N 2/0732 |
| JP | 2015-214329 | 12/2015 | | |

\* cited by examiner

VEHICLE SEAT

CROSS-REFERENCE TO RELATED APPLICATIONS

This application claims the benefit of Japanese Patent Application No. 2017-168661 filed on Sep. 1, 2017 with the Japan Patent Office, the disclosure of which is incorporated herein by reference.

BACKGROUND

The present disclosure relates to a vehicle seat.

For example, in a vehicle seat disclosed in Japanese Unexamined Patent Application Publication No. 2015-214329, a belt anchor bracket and a belt stay are coupled to each other via a coupling bolt. The belt anchor bracket is a seat belt bracket fixed directly or indirectly to a cushion frame or a vehicle. The belt stay is a member to which a buckle of a seat belt is coupled directly or indirectly.

SUMMARY

The coupling bolt according to the above-mentioned publication is positioned at the vertical-direction center of a side frame forming a part of the cushion frame (also referred to as a lower arm), and projects from the side frame toward a seat-width-direction outside (toward the right side, in the above-mentioned publication).

Thus, in the vehicle seat according to the above-mentioned publication, it is feared that the dimension of the vehicle seat in its width direction has to be larger. It is desirable that the present disclosure provides a vehicle seat in which a dimension thereof in its width direction can be smaller as compared with the vehicle seat according to the above-mentioned publication.

One aspect of the present disclosure is a vehicle seat mounted to a vehicle. The vehicle seat comprises: a cushion frame; a side frame forming a part of the cushion frame, the side frame extending in seat front-rear directions; a belt anchor bracket fixed directly or indirectly to the cushion frame or to the vehicle, at least part of the belt anchor bracket being positioned below the side frame; a belt stay to which a buckle of a seat belt is coupled directly or indirectly, at least part of the belt stay being positioned below the side frame; and a coupling bolt that couples the belt anchor bracket and the belt stay to each other at a position below the side frame, the coupling bolt passing through a first member, which is one of the belt anchor bracket and the belt stay, and reaching a second member, which is an other of the belt anchor bracket and the belt stay.

In such a configuration, the coupling bolt of the vehicle seat is positioned below the side frame. This inhibits a situation in which the coupling bolt protrudes from the side frame toward a seat-width-direction outside. Thus, the vehicle seat has a smaller dimension in its width direction.

The vehicle seat may be configured such that a central axis of the coupling bolt is inclined with respect to a horizontal direction. This allows the vehicle seat to have a smaller dimension in its width direction as compared with a configuration in which the central axis of the coupling bolt coincides with the horizontal direction.

One aspect of the present disclosure may further comprise a restrictor provided to the belt anchor bracket, the restrictor contacting the belt stay to thereby restrict the belt stay from rotating about the coupling bolt.

The belt anchor bracket may comprise: a first through hole through which a first bolt for fixing the belt anchor bracket passes; and a bolt hole into which the coupling bolt is inserted. The restrictor may be provided outside a sector-shaped region in the belt anchor bracket, a radius of the sector-shaped region being a distance between a center of the first through hole and a center of the bolt hole, a central angle of the sector-shaped region centered at the center of the bolt hole being approximately 90 degrees. The sector-shaped region may have a line-symmetric shape with respect to an imaginary line passing through the center of the first through hole and the center of the bolt hole.

Thus, in the vehicle seat, at least part of the coupling bolt is positioned on a seat-width-direction inside with respect to the side frame. Accordingly, the vehicle seat has an even smaller dimension in its width direction.

The belt anchor bracket may comprise, at a position displaced toward a seat-front side with respect to the first through hole, a second through hole through which a second bolt for fixing the belt anchor bracket passes.

The restrictor may be provided on an opposite side from the first through hole with the bolt hole therebetween in a seat width direction. Thus, in the vehicle seat, at least part of the coupling bolt is positioned on the seat-width-direction inside with respect to the side frame. Accordingly, the vehicle seat has an even smaller dimension in its width direction.

BRIEF DESCRIPTION OF THE DRAWINGS

An embodiment of the present disclosure will be described below by way of example with reference to the accompanying drawings, in which.

DETAILED DESCRIPTION OF THE PREFERRED EMBODIMENTS

Figure 1:
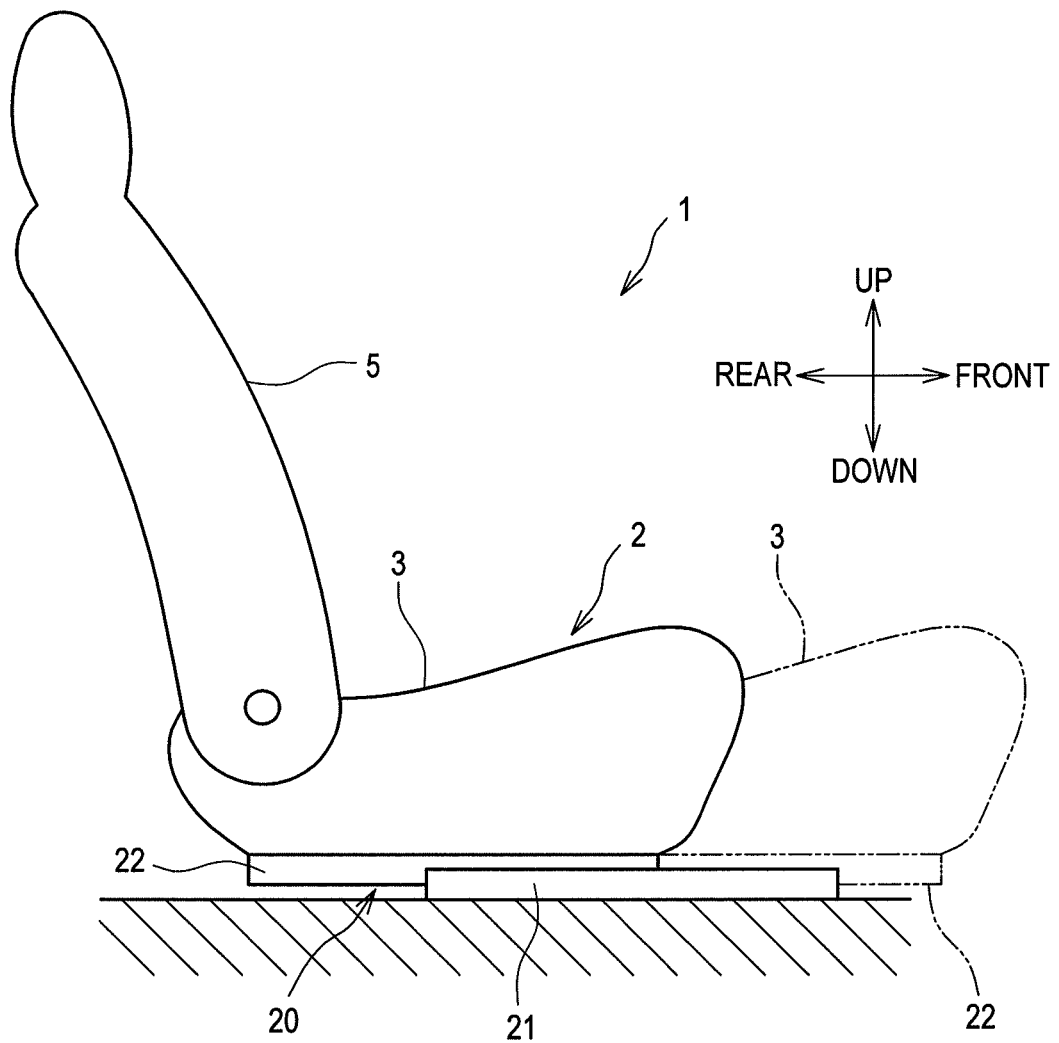
FIG. 1 is a diagram showing a vehicle seat according to the embodiment.
Figure 2:
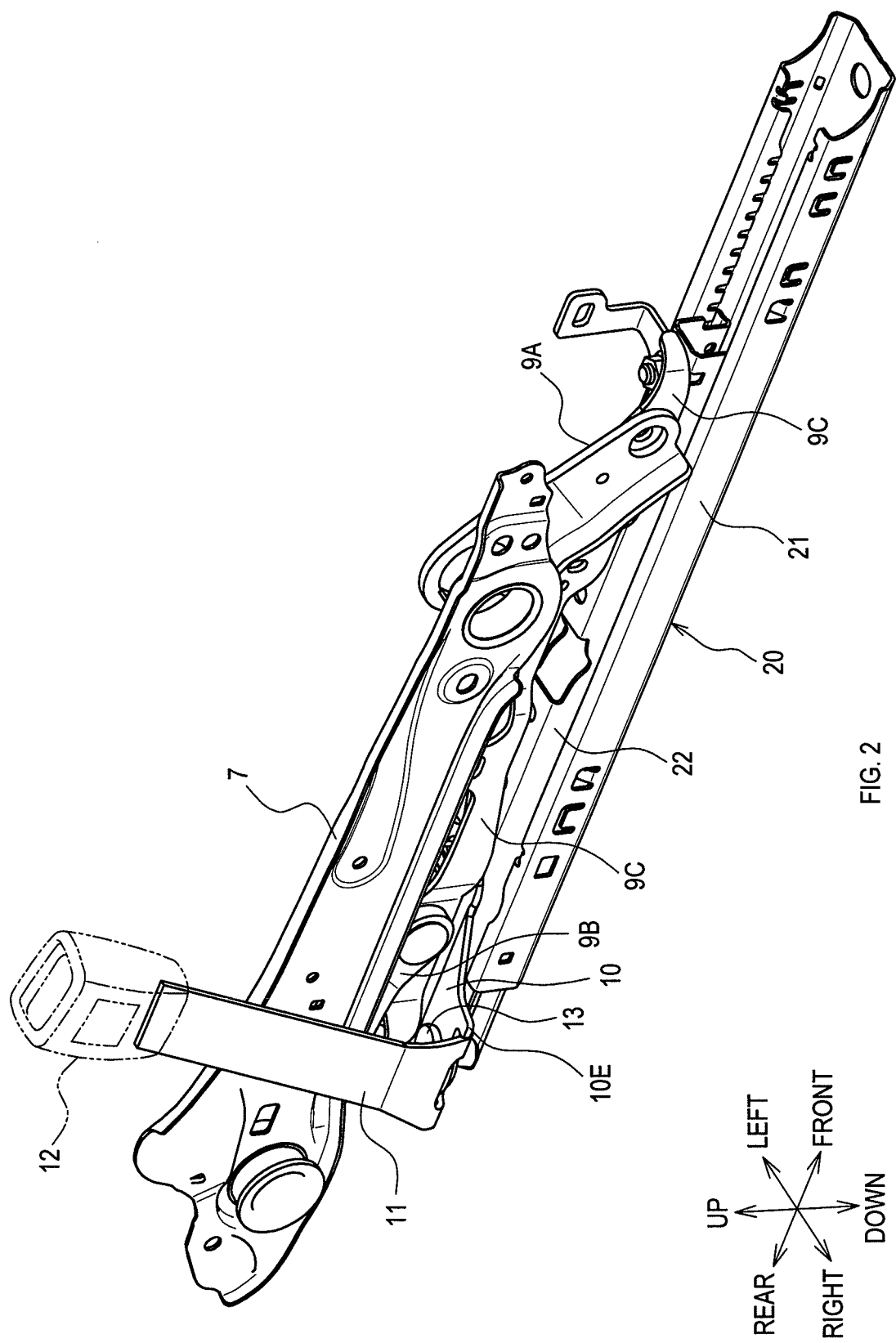
FIG. 2 is a diagram showing a structure of a side frame and so on according to the embodiment.
Figure 3:
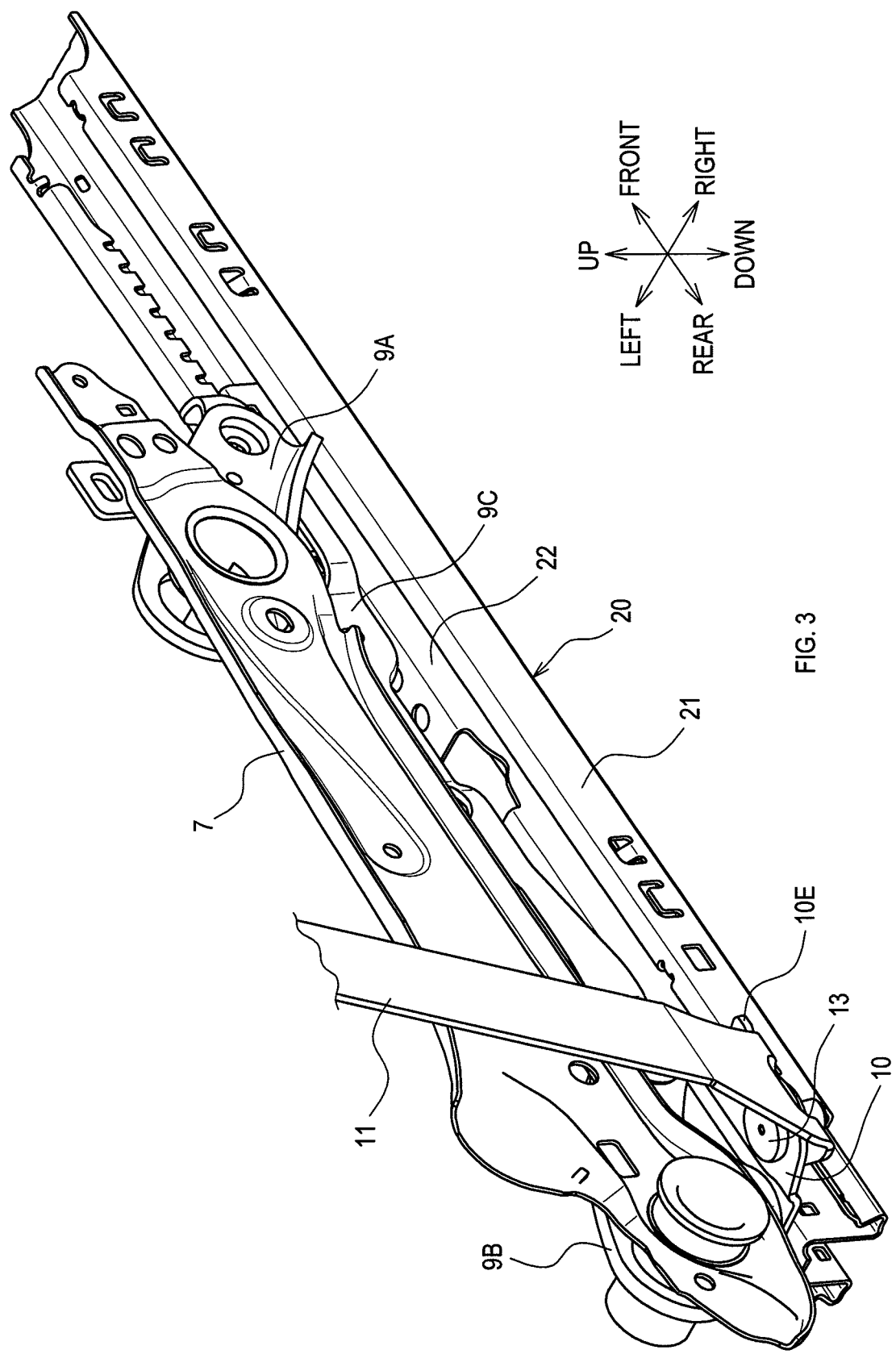
FIG. 3 is a diagram showing the structure of the side frame and so on according to the embodiment.
Figure 4:
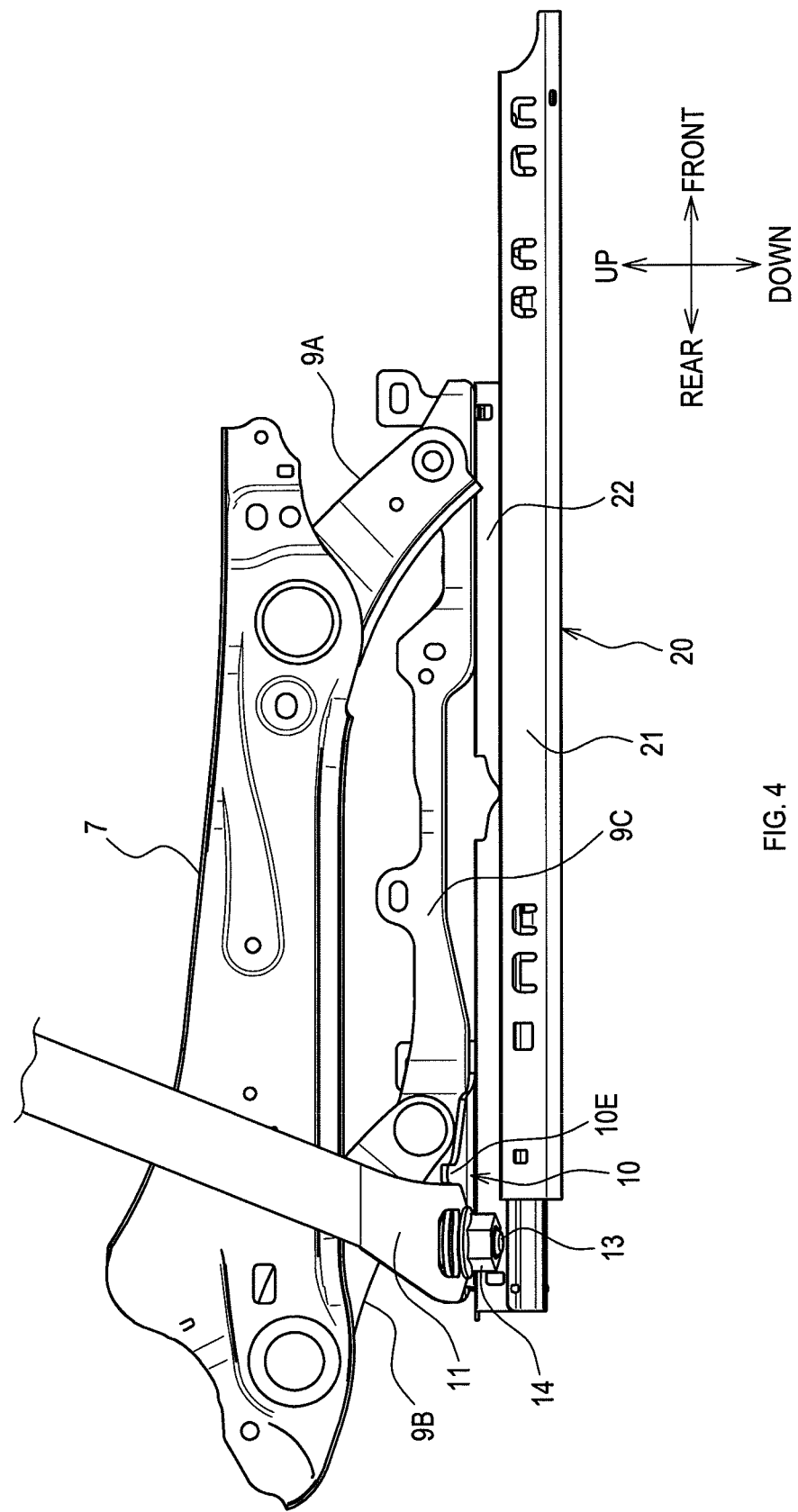
FIG. 4 is a diagram showing the structure of the side frame and so on according to the embodiment.
Figure 5:
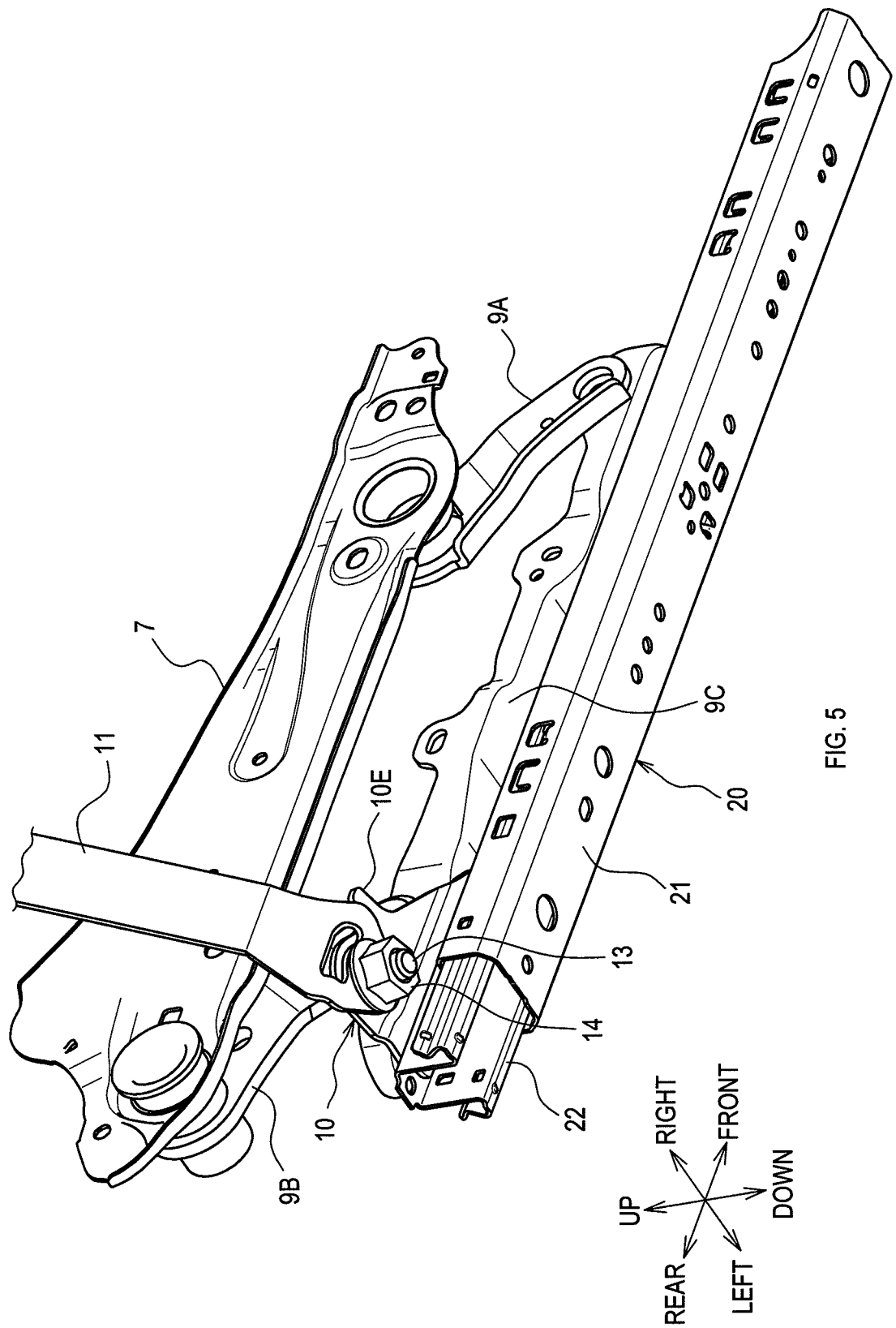
FIG. 5 is a diagram showing the structure of the side frame and so on according to the embodiment.

"Embodiments" described below are example embodiments falling within the technical scope of the present disclosure. In other words, invention-specifying matters and so on recited in the appended claims are not limited by specific configurations, structures, and the like, shown in the below-described embodiments.

At least a member or portion described with a reference numeral assigned thereto is at least one in number unless accompanied by a specifying term, such as "only one". In other words, two or more members or portions may be provided if no specifying term, such as "only one", is present.

Arrows and so on indicating directions shown in the drawings are provided for the purpose of easy understanding of mutual relationships between the drawings. The arrows and so on (directions) shown in the drawings do not limit the scope of the present disclosure. Each direction is based on a state where a vehicle seat according to the present embodiment is mounted to a vehicle.

An "occupant" herein means a crew of the vehicle and/or a user of the vehicle seat. Thus, the occupant includes a person who is actually not seated.

First Embodiment

1. Overview of Vehicle Seat

The present embodiment is a vehicle seat 1 shown in FIG. 1, which is mounted to a vehicle. A seat main body 2 of the vehicle seat 1 comprises a seat cushion 3 and a seatback 5.

The seat cushion 3 supports the occupant's buttocks. The seatback 5 supports the occupant's back. The seat main body 2 is fixed to the vehicle via a sliding device 20.

The sliding device 20 supports the seat main body 2 in a slidable manner. The sliding device 20 comprises at least a fixed rail 21 and a movable rail 22. The fixed rail 21 is fixed directly or indirectly to the vehicle. The movable rail 22 is mounted to the fixed rail 21 in a slidable manner.

The seat main body 2 is fixed to the movable rail 22. Thus, the seat main body 2 is slidingly displaceable in directions parallel to a longitudinal direction of the fixed rail 21. In the present embodiment, the longitudinal direction of the fixed rail 21 is parallel to front-rear directions of the vehicle.

2. Coupling Structure Between Belt Anchor Bracket and Belt Stay 2.1 Overview of Coupling Structure A side frame 7 shown in FIGS. 2 to 5 forms a part of a cushion frame. The side frame 7 forms a lower arm extending in seat front-rear directions. The cushion frame forms a framework of the seat cushion 3.

The side frame 7 is provided on each of the right and left sides of the seat cushion 3. Of the right side and the left side of the seat cushion 3, the side frame 7 shown in FIGS. 2 to 5 is arranged on a side where a belt anchor bracket 10 and a belt stay 11 are provided (on the right side, in the present embodiment).

The side frame 7 is coupled to the movable rail 22 via a first lifter link 9A and a second lifter link 9B. An upper end of the first lifter link 9A and an upper end of the second lifter link 9B are each coupled to the side frame 7 in a pivotable manner.

A lower end of the first lifter link 9A and a lower end of the second lifter link 9B are each coupled to an intermediate bracket 9C in a pivotable manner. The intermediate bracket 9C is fixed to an upper surface of the movable rail 22. Thus, the side frame 7, or the cushion frame, is displaceable up and down with respect to the sliding device 20.

The belt stay 11 is a member to which a buckle 12 of a seat belt (not shown) is coupled directly or indirectly. The buckle 12 is a member to which a tongue plate (not shown) of the seat belt is detachably attached.

The belt anchor bracket 10 is a member for fixing the belt stay 11 to the vehicle. The belt anchor bracket 10 is fixed directly or indirectly to the cushion frame or to the vehicle.

The belt anchor bracket 10 according to the present embodiment is fixed to the movable rail 22. In other words, the belt anchor bracket 10 according to the present embodiment is indirectly fixed to the vehicle via the sliding device 20.

2.2 Details of Coupling Structure

<Coupling Structure>

Figure 6:
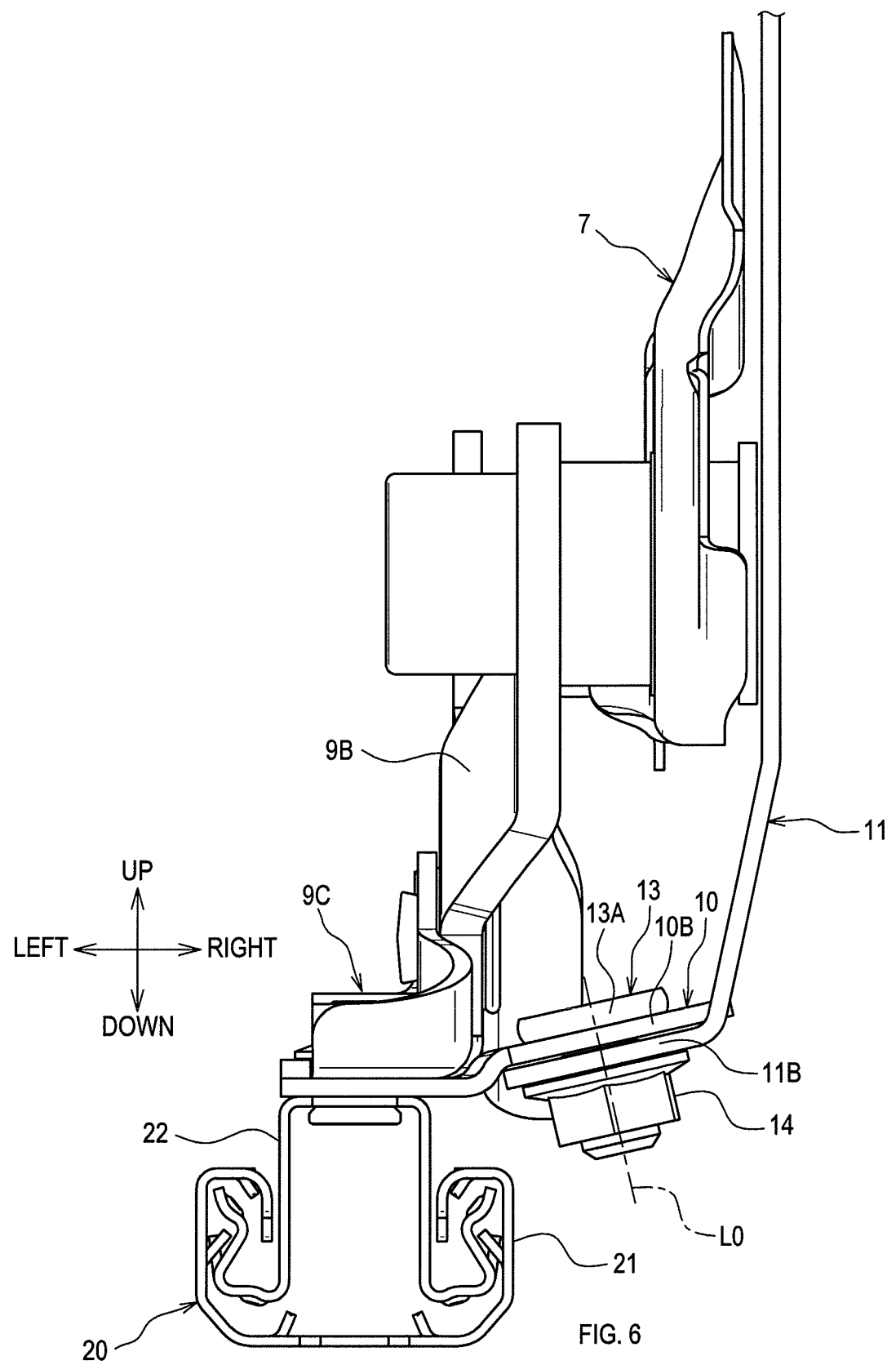
FIG. 6 is a diagram showing a coupling structure between a belt anchor bracket and a belt stay according to the embodiment.

As shown in FIG. 6, the belt anchor bracket 10 is fixed to the movable rail 22 at a position below the side frame 7. Part of the belt stay 11 is positioned below the side frame 7.

The belt anchor bracket 10 and the belt stay 11 are coupled to each other via a coupling bolt 13 at a position below the side frame 7. The phrase "below the side frame 7" means "below the side frame 7 when the side frame 7 is displaced uppermost".

Figure 7A:
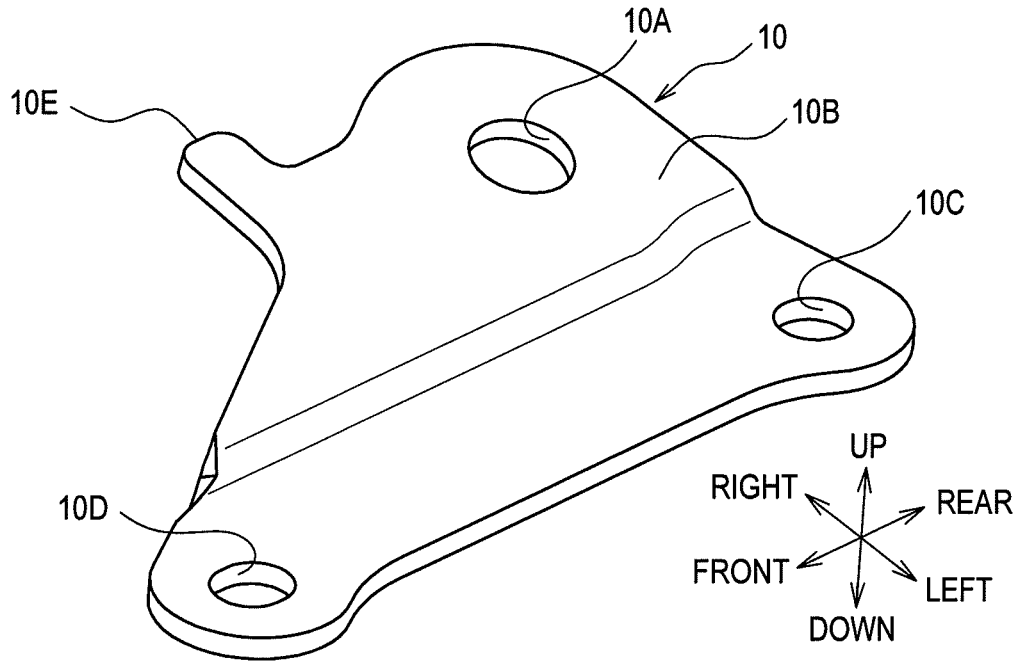
FIG. 7A and FIG. 7B are diagrams showing the belt anchor bracket according to the embodiment.

The coupling bolt 13 is a bolt that passes through a first member, which is one of the belt anchor bracket 10 and the belt stay 11, and reaches a second member, which is the other of the belt anchor bracket 10 and the belt stay 11. Specifically, as shown in FIG. 7A, the belt anchor bracket 10 contains a first bolt hole 10A, through which the coupling bolt 13 is inserted.

Figure 8:
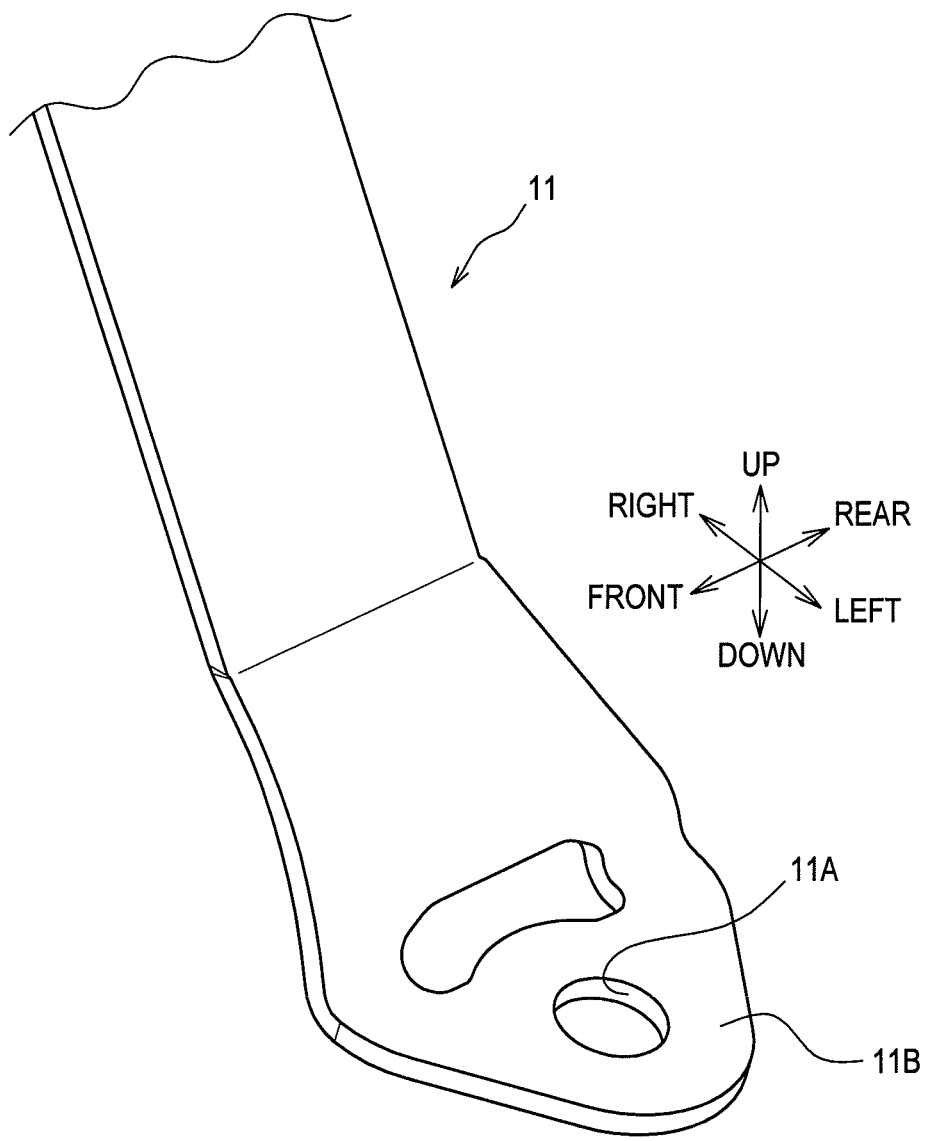
FIG. 8 is a diagram showing the belt stay according to the embodiment.

As shown in FIG. 8, the belt stay 11 contains a second bolt hole 11A, through which the coupling bolt 13 is inserted. As shown in FIG. 6, in the belt stay 11, a second portion 11B where the second bolt hole 11A is arranged faces a lower surface of a first portion 10B where the first bolt hole 10A is arranged in the belt anchor bracket 10.

The coupling bolt 13 is inserted through the bolt holes 10A and 11A such that a head 13A of the coupling bolt 13 is positioned on an upper side of the second portion 10B. The coupling bolt 13 is fixed to the first portion 10B by a fixing method such as welding. A nut 14 is screwed up on a leading-end portion of the coupling bolt 13.

In this way, the first portion 10B and the second portion 11B are held between the head 13A of the coupling bolt 13 and the nut 14. In other words, the belt stay 11 is coupled and fixed to the belt anchor bracket 10 via the coupling bolt 13.

A central axis L0 of the coupling bolt 13 is inclined with respect to a horizontal direction. That is, plate faces forming the first portion 10B and the second portion 11B are inclined with respect to the horizontal direction. The coupling bolt 13 is inserted into the bolt holes 10A and 11A such that normal directions of the plate faces and the central axis L0 are substantially parallel to each other.

<Structure of Belt Anchor Bracket>

Figure 7B:
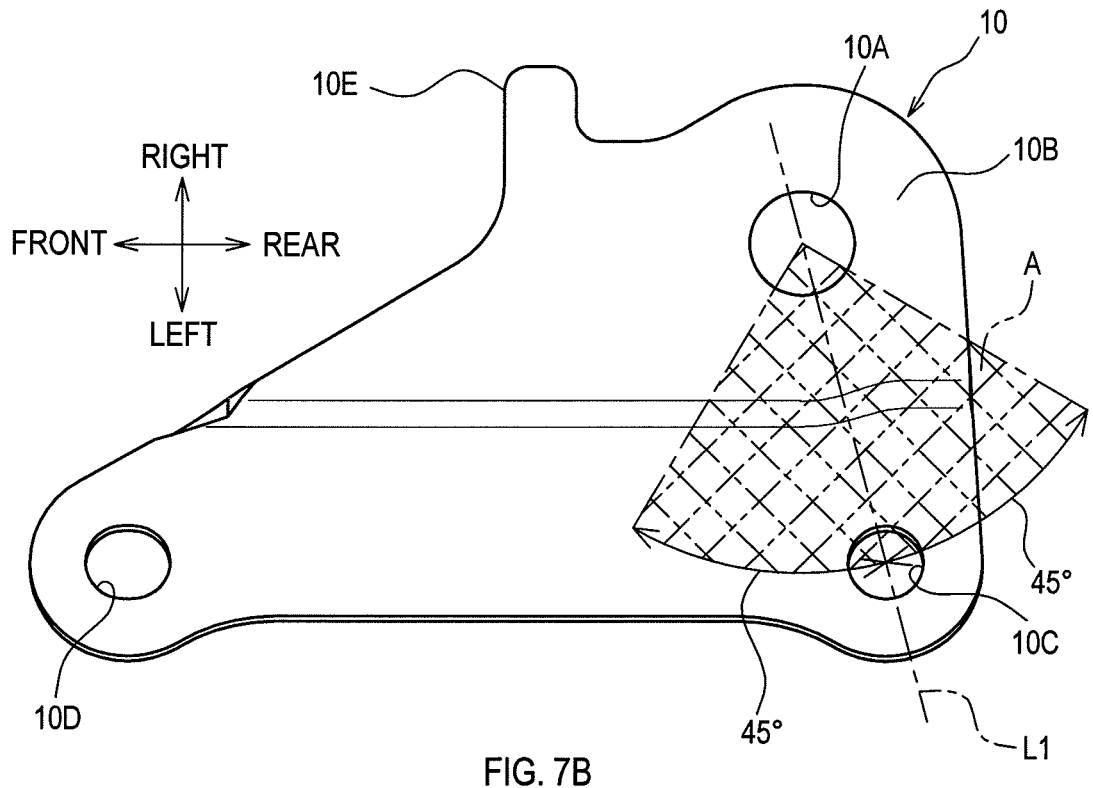

As shown in FIG. 7B, the belt anchor bracket 10 contains a first through hole 10C and a second through hole 10D, through which bolts can pass. The first through hole 10C is a through hole for through-insertion of a first bolt (not shown) for fixing the belt anchor bracket 10 to the movable rail 22.

The second through hole 10D is a through hole that is positioned on a seat-front side with respect to the first through hole 10C and through which a second bolt (not shown) for fixing the belt anchor bracket 10 to the movable rail 22 is inserted.

The belt anchor bracket 10 comprises a restrictor 10E. The restrictor 10E contacts the belt stay 11 to thereby restrict the belt stay 11 from rotating about the coupling bolt 13 (see FIG. 5).

As shown in FIG. 7B, the restrictor 10E is provided outside a sector-shaped region A (a region crosshatched with two-dot chain lines), in the belt anchor bracket 10. More specifically, the restrictor 10E is provided in a region opposite from the first through hole 10C with the first bolt hole 10A therebetween in a seat width direction.

The restrictor 10E is positioned on an imaginary circle centered at the center of the first bolt hole 10A. Specifically, the restrictor 10E is provided at a position where it can contact the belt stay 11 rotating together with the nut 14 when the nut 14 is screwed up by an operator.

The radius of the sector-shaped region A is a distance between the center of the first through hole 10C and the center of the first bolt hole 10A, and the central angle of the sector-shaped region A centered at the center of the first bolt hole 10A is approximately 90 degrees. The sector-shaped region A has a line-symmetric shape with respect to an imaginary line L1 passing through the center of the first through hole 10C and the center of the first bolt hole 10A.

The positions of the center of the first through hole 10C and the center of the first bolt hole 10A refer to those projected on an imaginary plane parallel to the plate face of the first portion 10B. Thus, the sector-shaped region A and the above-mentioned radius also refer to those projected on the imaginary plane.

3. Characteristics of Vehicle Seat according to Embodiment

The coupling bolt 13 according to the present embodiment is positioned below the side frame 7. This inhibits a situation in which the coupling bolt 13 protrudes from the side frame 7 toward a seat-width-direction outside (toward the right side, in the present embodiment). Thus, the vehicle seat 1 has a smaller dimension in its width direction.

The seat-width-direction outside means more outside than the side frame 7.

The central axis L0 of the coupling bolt 13 is inclined with respect to the horizontal direction. This allows the vehicle seat 1 to have a smaller dimension in its width direction as compared with a configuration in which the central axis L0 of the coupling bolt 13 coincides with the horizontal direction.

The restrictor 10E, which restricts the belt stay 11 from rotating about the coupling bolt 13, is provided outside the sector-shaped region A in the belt anchor bracket 10. Thus, in the vehicle seat 1, at least part of the coupling bolt 13 (the head 13A, in the present embodiment) is positioned on a seat-width-direction inside with respect to the side frame 7 (see FIG. 6). Accordingly, the vehicle seat 1 has a smaller dimension in its width direction.

The restrictor 10E is provided on an opposite side from the first through hole 10C with the first bolt hole 10A therebetween in the seat width direction. Thus, in the vehicle seat 1, at least part of the coupling bolt 13 (the head 13A, in the present embodiment) is positioned on the seat-width-direction inside with respect to the side frame 7. Accordingly, the vehicle seat 1 has a smaller dimension in its width direction.

Other Embodiments

For example, the head 13A of the coupling bolt 13 does not necessarily have to be fixed to the belt anchor bracket 10.

For example, the vehicle seat 1 may have a configuration (a) or (b) mentioned below:

(a) a configuration in which the nut 14 is fixed to the belt stay 11 or to the belt anchor bracket 10 by a fixing method such as welding, and the coupling bolt 13 is fastened to the fixed nut 14, (b) a configuration not using the nut 14, in which a female thread is formed in the belt stay 11 or the belt anchor bracket 10, and the coupling bolt 13 is fastened to the female thread.

In the above configuration (b), the coupling bolt 13 does not necessarily have to pass through whichever of the belt stay 11 or the belt anchor bracket 10 has the female thread formed therein.

For example, the central axis L0 of the coupling bolt 13 may be parallel to the horizontal direction.

For example, the belt anchor bracket 10 does not necessarily have to comprise the restrictor 10E.

For example, the vehicle seat 1 may have a configuration in which the restrictor 10E is provided within the sector-shaped region A, or a configuration in which the restrictor 10E is provided on the same side as the first through hole 10C with respect to the first bolt hole 10A in the seat width direction.

For example, the vehicle seat 1 may have a configuration in which the belt anchor bracket 10 contains only either one of the first through hole 10C or the second through hole 10D, or a configuration in which the belt anchor bracket 10 is welded to the movable rail 22.

For example, the second portion 11B (the belt stay 11) may be positioned above the first portion 10B (the belt anchor bracket 10).

The above-described embodiments are each for a passenger car seat. However, applications of the present disclosure are not limited to this. The present disclosure can also be applied to seats used in other vehicles, such as railway vehicles, ships, and aircrafts, and to stationary seats used at theaters, homes, and other places.

Furthermore, the present disclosure may be embodied in various forms conforming to the gist of the invention recited in the appended claims, and is not limited to the above-described embodiments. Thus, at least two of the above-described embodiments may be combined together.

What is claimed is:

1. A vehicle seat mounted to a vehicle, the vehicle seat comprising:
   a cushion frame;
   a side frame forming a part of the cushion frame, the side frame extending in seat front-rear directions;
   a belt anchor bracket fixed directly or indirectly to the cushion frame or to the vehicle, at least part of the belt anchor bracket being positioned below the side frame;
   a belt stay to which a buckle of a seat belt is coupled directly or indirectly, at least part of the belt stay being positioned below the side frame; and
   a coupling bolt that couples the belt anchor bracket and the belt stay to each other at a position below the side frame, the coupling bolt passing through a first member, which is one of the belt anchor bracket and the belt stay, and reaching a second member, which is an other of the belt anchor bracket and the belt stay,
   wherein the coupling bolt couples the belt anchor bracket and the belt stay at a position in vertical alignment with a portion of the side frame.

2. The vehicle seat according to claim 1,
   wherein a central axis of the coupling bolt is inclined with respect to a horizontal direction.

3. The vehicle seat according to claim 1, further comprising a restrictor provided to the belt anchor bracket, the restrictor contacting the belt stay to thereby restrict the belt stay from rotating about the coupling bolt,
   wherein the belt anchor bracket comprises:
      a first through hole through which a first bolt for fixing the belt anchor bracket passes; and
      a bolt hole into which the coupling bolt is inserted,
   wherein the restrictor is provided outside a sector-shaped region in the belt anchor bracket, a radius of the sector-shaped region being a distance between a center of the first through hole and a center of the bolt hole, a central angle of the sector-shaped region centered at the center of the bolt hole being approximately 90 degrees, and wherein the sector-shaped region has a line-symmetric shape with respect to an imaginary line passing through the center of the first through hole and the center of the bolt hole.

4. The vehicle seat according to claim 3,
wherein the belt anchor bracket comprises, at a position displaced toward a seat-front side with respect to the first through hole, a second through hole through which a second bolt for fixing the belt anchor bracket passes.

5. The vehicle seat according to claim 3,
wherein the restrictor is provided on an opposite side from the first through hole with the bolt hole therebetween in a seat width direction.

6. The vehicle seat according to claim 1, further comprising a restrictor provided to the belt anchor bracket, the restrictor contacting the belt stay to thereby restrict the belt stay from rotating about the coupling bolt,
wherein the restrictor protrudes more in a seat width direction than the coupling bolt.

7. The vehicle seat according to claim 1, further comprising a restrictor provided to the belt anchor bracket, the restrictor contacting the belt stay to thereby restrict the belt stay from rotating about the coupling bolt,
wherein the belt anchor bracket comprises:
a first through hole through which a first bolt for fixing the belt anchor bracket passes; and
a bolt hole into which the coupling bolt is inserted, and
wherein the restrictor is provided in a region opposite from the first through hole with the bolt hole therebetween in a seat width direction.

8. The vehicle seat according to claim 1, further comprising a restrictor provided to the belt anchor bracket, the restrictor contacting the belt stay to thereby restrict the belt stay from rotating about the coupling bolt,
wherein the belt anchor bracket is fixed directly or indirectly to the cushion frame.

9. The vehicle seat according to claim 1,
wherein a leading-end portion of the coupling bolt is located below a lower end of the belt stay.

10. The vehicle seat according to claim 1,
wherein an angle of inclination with respect to a horizontal direction of a central axis of the coupling bolt is greater than an angle of inclination with respect to a vertical direction of a central axis of the coupling bolt.

\* \* \* \* \*